(12) United States Patent
Sudo et al.

(10) Patent No.: US 10,268,112 B2
(45) Date of Patent: Apr. 23, 2019

(54) ILLUMINATION OPTICAL SYSTEM AND IMAGE PROJECTION APPARATUS WITH THE SAME

(71) Applicant: CANON KABUSHIKI KAISHA, Tokyo (JP)

(72) Inventors: Takashi Sudo, Inagi (JP); Yuuki Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/623,745

(22) Filed: Jun. 15, 2017

(65) Prior Publication Data

US 2017/0285352 A1 Oct. 5, 2017

Related U.S. Application Data

(62) Division of application No. 14/667,948, filed on Mar. 25, 2015, now Pat. No. 9,746,758.

(30) Foreign Application Priority Data

Apr. 1, 2014 (JP) .................................. 2014-075161
Mar. 9, 2015 (JP) .................................. 2015-045685

(51) Int. Cl.
*G03B 21/20* (2006.01)
*G02B 27/09* (2006.01)
*G02B 19/00* (2006.01)

(52) U.S. Cl.
CPC ....... *G03B 21/208* (2013.01); *G02B 19/0014* (2013.01); *G02B 27/0927* (2013.01); *G02B 27/0961* (2013.01); *G02B 19/0047* (2013.01)

(58) Field of Classification Search
CPC . G03B 21/20; G02B 3/00; G02B 3/06; G02B 19/00; G02B 27/09
See application file for complete search history.

(56) References Cited

U.S. PATENT DOCUMENTS 5,649,753 A * 7/1997 Masumoto ......... G03B 21/2013
348/E9.027
6,478,430 B2 11/2002 Wada
(Continued)

FOREIGN PATENT DOCUMENTS

CN 1260668 A 7/2000
CN 1949077 A 4/2007
(Continued)

OTHER PUBLICATIONS

Japanese Office Action issued in corresponding Japanese Application No. 2015045685 dated Oct. 31, 2017.
(Continued)

*Primary Examiner* — Cara Rakowski
*Assistant Examiner* — Danell L Owens
(74) *Attorney, Agent, or Firm* — Venable LLP (57) ABSTRACT

An illumination optical system illuminates an image display element and includes a first lens array configured to divide light emitted from a light source, a second lens array configured to receive light from the first lens array, and a condenser optical system configured to guide light from the second lens array to the image display element, and a conjugate point of the image display element is located between an incident surface of the first lens array and an incident surface of the second lens array.

43 Claims, 7 Drawing Sheets

(56) References Cited

U.S. PATENT DOCUMENTS

| | | | |
|---|---|---|---|
| 6,559,900 B1 | 5/2003 | Kanamori et al. | |
| 7,382,539 B2 | 6/2008 | Akiyama | |
| 8,857,996 B2 | 10/2014 | Kawasumi | |
| 2002/0018150 A1 | 2/2002 | Ogawa et al. | |
| 2002/0131021 A1 | 9/2002 | Wada | |
| 2006/0092390 A1 | 5/2006 | Akiyama | |
| 2009/0284838 A1* | 11/2009 | Sudo | G02B 27/0961 359/622 |
| 2012/0162610 A1 | 6/2012 | Maeda et al. | |

FOREIGN PATENT DOCUMENTS

| | | |
|---|---|---|
| CN | 102591017 A | 7/2012 |
| CN | 102736383 | 10/2012 |
| JP | 11-295652 A | 10/1999 |
| JP | 2000305170 A | 11/2000 |
| JP | 2001-021997 A | 1/2001 |
| JP | 2003255272 A | 9/2003 |
| JP | 2003279880 A | 10/2003 |
| JP | 2005049593 A | 2/2005 |
| JP | 2005-265925 A | 9/2005 |
| JP | 2006-154782 A | 6/2006 |
| JP | 2011-090321 A | 5/2011 |
| JP | 2012137654 A | 7/2012 |

OTHER PUBLICATIONS

Office Action dated Jun. 27, 2016, in Chinese Patent Application No. 201510151866.7.

* cited by examiner

FIG. 8  ※ UNIT [μm]

ILLUMINATION OPTICAL SYSTEM AND IMAGE PROJECTION APPARATUS WITH THE SAME

This application is a division of application Ser. No. 14/667,948, filed Mar. 25, 2015.

BACKGROUND OF THE INVENTION

Field of the Invention

The present invention relates to an illumination optical system and an image projection apparatus having the illumination optical system.

Description of the Related Art

Recently, in an image projection apparatus such as a liquid crystal projector, a luminance is being improved by improving the illumination efficiency. In order to improve the illumination efficiency, it is preferred that an illumination area is narrowed and an edge portion of the illumination area is sharpened. Japanese Patent Laid-open No. 2011-90321 discloses an illumination apparatus in which an illumination plane is located at a light source side relative to a paraxial image plane of a curved image plane and also a peripheral image plane of the curved image plane is located at the light source side relative to the paraxial image plane. In this configuration, blurring of the illumination area is eased by the influence of the field curvature.

However, in the configuration of Japanese Patent Laid-open No. 2011-90321, a panel surface is set to the light source side relative to the paraxial image plane, and thus a conjugate point of the panel is located at the light source side relative to a first lens array (fly-eye lens). In this case, a high luminance part (streak) is generated at an end part of the illumination area, and therefore the effective illumination area is narrowed. As a result, it is necessary to ensure an area margin and thus the brightness is decreased. On the other hand, if the area margin is insufficient, the streak is projected and an image quality is deteriorated.

SUMMARY OF THE INVENTION

The present invention provides an illumination optical system and an image projection apparatus that are capable of achieving projection of a high-luminance and high-quality image.

An illumination optical system as one aspect of the present invention illuminates an image display element, and includes a first lens array configured to divide light emitted from a light source, a second lens array configured to receive light from the first lens array, and a condenser optical system configured to guide light from the second lens array to the image display element, and a conjugate point of the image display element is located between an incident surface of the first lens array and an incident surface of the second lens array.

An image projection apparatus as another aspect of the present invention includes an image display element and an illumination optical system configured to illuminate the image display element, the illumination optical system includes a first lens array configured to divide light emitted from a light source, a second lens array configured to receive light from the first lens array, and a condenser optical system configured to guide light from the second lens array to the image display element, and a conjugate point of the image display element is located between an incident surface of the first lens array and an incident surface of the second lens array.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 5:
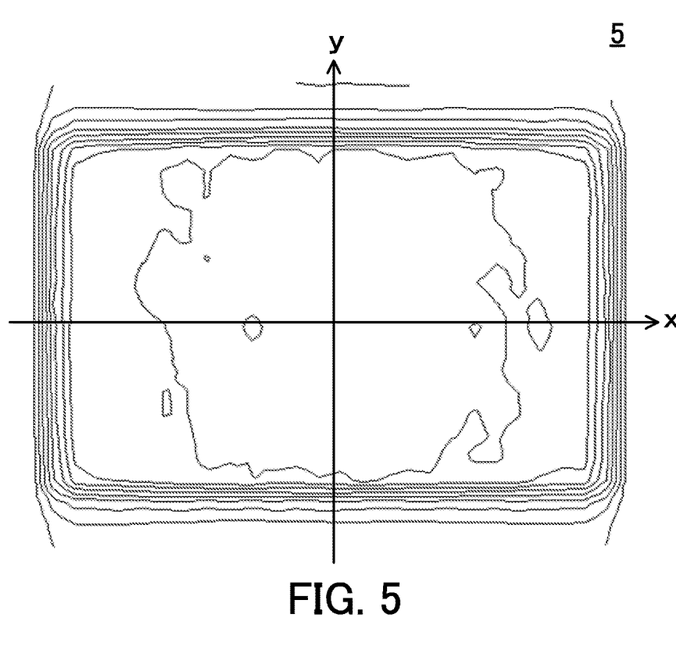
FIG. 5 is a diagram of explaining luminance unevenness.

First of all, for an image projection apparatus including a typical illumination optical system, a principle of generation of a high luminance part (hereinafter, referred to as a streak) that is generated at an end part in an illumination area will be described. Referring to FIG. 5, a phenomenon of the streak will be described. FIG. 5 is a diagram of explaining two-dimensional luminance unevenness, and illustrates an illumination area on a surface of an image display element (panel surface). In FIG. 5, an arrow in a horizontal direction indicates a long side direction (x axis) of a panel and an arrow in a vertical direction indicates a short side direction (y axis) of the panel.

Figure 6:
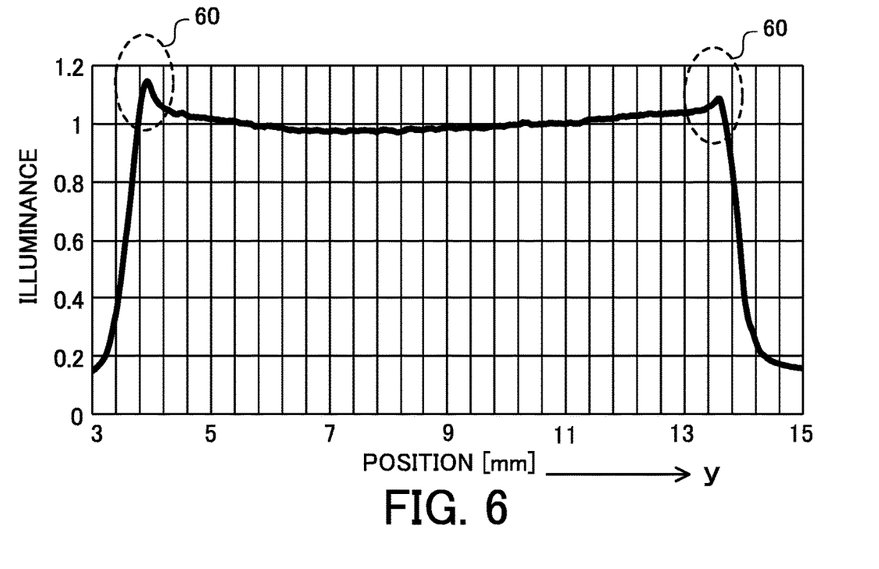
FIG. 6 is a diagram of a luminance distribution in a short side direction of a panel.
Figure 7:
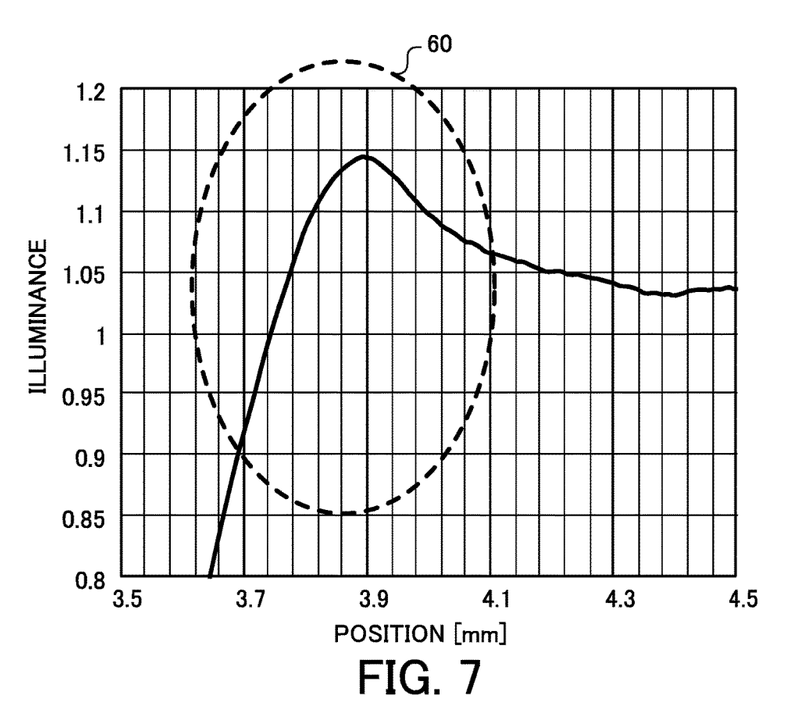
FIG. 7 is an enlarged diagram of a high luminance part in FIG. 6.

FIG. 6 is a diagram of a luminance distribution in a y direction in FIG. 5. In FIG. 6, a vertical axis indicates an illuminance and a horizontal axis indicates a position (y axis). A dashed line part 60 in FIG. 6 represents a high luminance part (streak). FIG. 7 is an enlarged diagram of the dashed line part 60 and its periphery in FIG. 6. When the streak part exists inside an effective region of the image display element 5 (panel effective region), it is recognized as a bright emission line in displaying an image and it causes the degradation of the level of the image quality. Therefore, the image projection apparatus needs to be designed to have a margin for a width of an illumination region (illumination area) to ensure a broader illumination area such that the streak is not included in the panel effective region. Accordingly, the intrusion of the streak into the image can be prevented. However, designing the image projection apparatus to widen the illumination area, the brightness in the effective region of the panel surface is decreased. Therefore, it is disadvantageous in view of an illumination efficiency.

Subsequently, a principle of generation of the streak will be described in detail. The generation of the streak is caused by two optical configurations (two factors) A first factor is that a shape of a boundary part (cell boundary part) between cells adjacent to each other in a first fly-eye lens 2 (first lens array or first light division unit) is a concave, i.e. the cell boundary part has a negative refractive index. A second factor is the position of the conjugate point of the image display element (panel).

Figure 8:
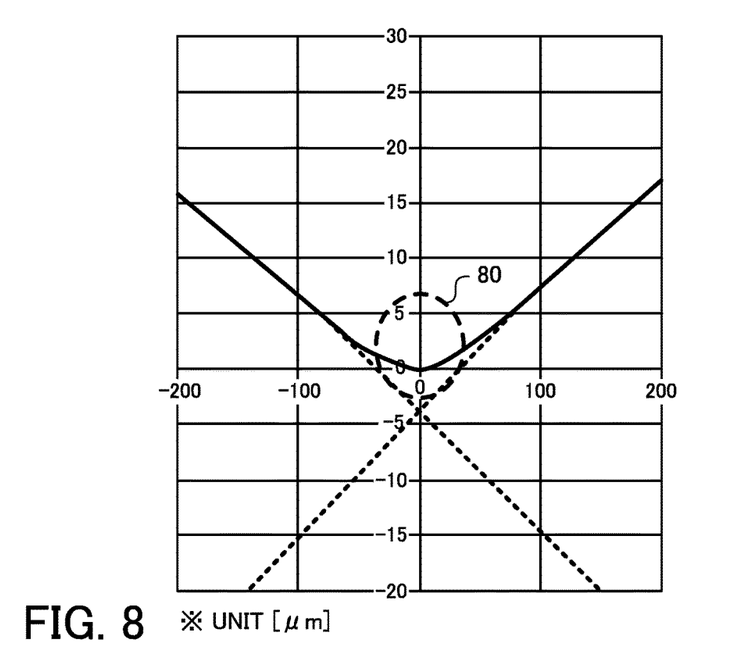
FIG. 8 is an enlarged diagram of a cell boundary part of a fly-eye lens.

Referring to FIG. 8, for the first factor, the shape of the first fly-eye lens 2 (cell boundary part) will be described. FIG. 8 is an enlarged diagram of the cell boundary part of the first fly-eye lens 2. In a typical fly-eye lens, due to manufacturing reasons, the boundary part (cell boundary part) between the adjacent cells has a concave shape as indicated by a dashed line part 80 in FIG. 8. The fly-eye lens is manufactured with a mold. In this case, with respect to the shape of the boundary part of the fly-eye lens, an error of a shape of the mold tends to be increased. With respect to the boundary part, a good transfer accuracy cannot be achieved in many cases. Therefore, the cell boundary part of the fly-eye lens has the concave shape. Even when the accuracy of the mold is improved, the concave portion of the cell boundary part only changes its depth or width and it is difficult to completely remove the concave portion.

Next, for the second factor, the conjugate point of the image display element 5 (panel) will be described. For example, in the configuration disclosed in Japanese Patent Laid-open No. 2011-90321, the conjugate point of the panel is located at alight source side of the first fly-eye lens. Even when a configuration other than that disclosed in Japanese Patent Laid-open No. 2011-90321, the conjugate point of the panel is typically set to be located at the light source side. Hereinafter, this reason will be described.

Typically, the first fly-eye lens 2 and the surface (panel surface) of the image display element 5 are located at positions having an approximately paraxial conjugate relation. However, when these are set to positions having a completely conjugate relation, a scratch or dust on the first fly-eye lens 2 are imaged on the panel surface and the scratch or dust on the first fly-eye lens are projected onto a screen (projection surface). Therefore, these are slightly shifted (displaced) from the positions having the conjugate relation in an optical axis direction to perform the illumination design to manufacture the image projection apparatus. With respect to a direction in which these are shifted, the conjugate position of the panel is typically designed to be shifted to the light source side of the first fly-eye lens.

Figure 9:
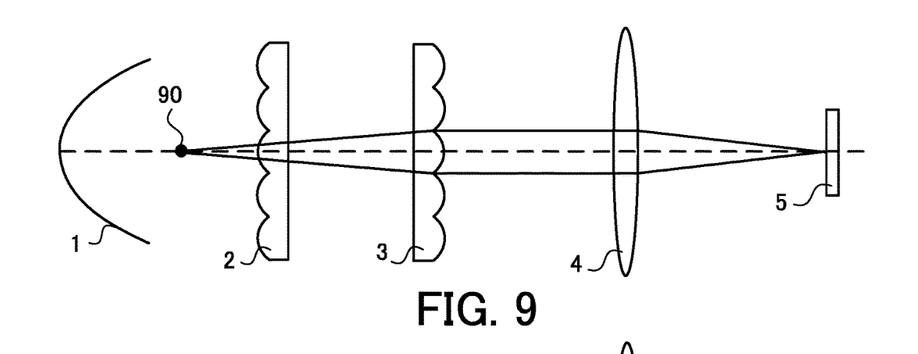
FIG. 9 is a diagram of explaining a conjugate point of the panel.

Referring to FIG. 9, the conjugate point of the image display element 5 (panel) will be described. FIG. 9 is a diagram of explaining the conjugate point of the image display element 5. In FIG. 9, reference numeral 1 denotes a light source unit. The light source unit 1 includes a light source and a paraboloid reflector, and the light source unit 1 is configured to emit parallel light from the light source. Reference numeral 2 denotes a first fly-eye lens, reference numeral 3 denotes a second fly-eye lens, reference numeral 4 denotes a condenser lens (condenser optical system), and reference numeral 5 denotes an image display element (panel). circle black dot 90 in FIG. 9 denotes a conjugate point of the panel. The conjugate point of the panel is shifted to the light source unit 1 relative to a surface having a power of the first fly-eye lens 2 (left side surface of the first fly-eye lens 2 in FIG. 9) to be able to increase a focal length (increase a radius of curvature) of the second fly-eye lens 3. As a result, the influence of the scratch or dust on the surface of the first fly-eye lens 2 described above is suppressed and the second fly-eye lens 3 can be easily molded. Typically, in order to reduce the size of the image projection apparatus, the focal length of the fly-eye lens is designed to be shortened and the radius of curvature is reduced.

Figure 10:
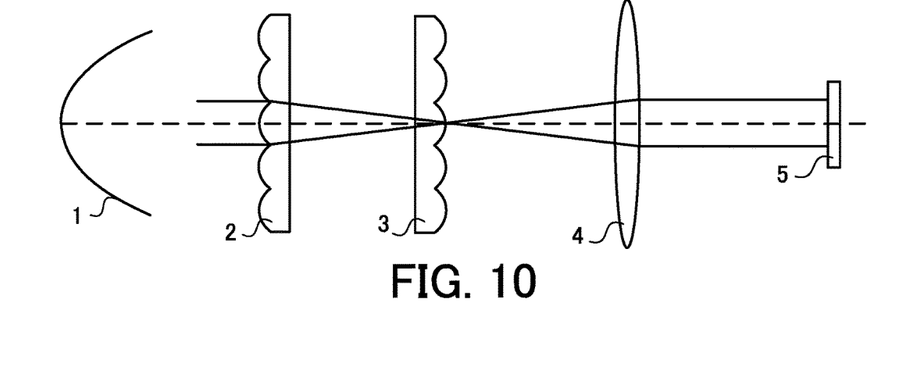
FIG. 10 is a diagram of an optical path of parallel light which enters a region other than the cell boundary part of a first fly-eye lens.

Subsequently, referring to FIGS. 10 and 11, the reasons of generation of streak based on the two factors described above will be described. FIG. 10 is a diagram of an optical path of parallel light which enters a region other than the cell boundary part of the first fly-eye lens 2. In FIG. 10, the parallel light which enters the first fly-eye lens 2 (cell part) is condensed at a position near the second fly-eye lens 3. Then, this light becomes parallel light by the condenser lens 4 to illuminate the image display element 5 (panel).

Figure 11:
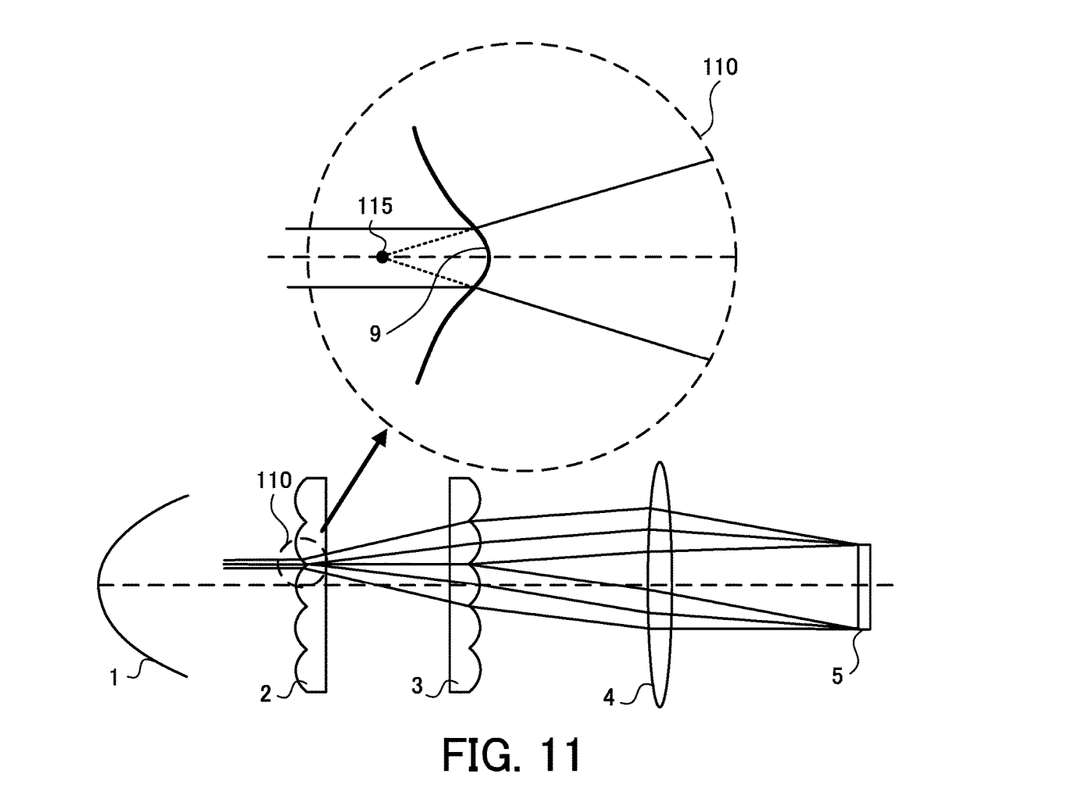
FIG. 11 is a diagram of an optical path of parallel light which enters the cell boundary part of the first fly-eye lens.

FIG. 11 is a diagram of an optical path of parallel light which enters the cell boundary part (or a region near the cell boundary part) of the first fly-eye lens 2. As described above, the cell boundary part 9 has the concave shape and therefore it has a negative refractive power. Accordingly, the parallel light which enters the cell boundary part 9 is diverged and emitted by the negative refractive power. An apparent light emitting point is located at an incident side of the cell boundary part 9, and is located at a position indicated by a black dot 115 in a dashed line part 110 in FIG. 11. Divergent light that is emitted from the cell boundary part 9 becomes approximately parallel light by the second fly-eye lens 3 and then enters the condenser lens 4. Light entering the condenser lens 4 is condensed toward an end part of the surface (panel surface) of the image display element 5. Accordingly, a high luminance streak (high luminance part) appears at the end part of the panel surface. In other words, when the apparent light emitting point (black dot 115) by the concave of the cell boundary part 9 coincides with the conjugate point of the panel surface, the streak is generated. The cell boundary part 9 has a positive refractive power in the cell effective region, and it has a negative refractive power in the most concave region of the cell boundary part 9. As described above, the cell boundary part 9 is configured such that the radius of curvature gradually changes from the positive refractive power to the negative refractive power.

Figure 12:
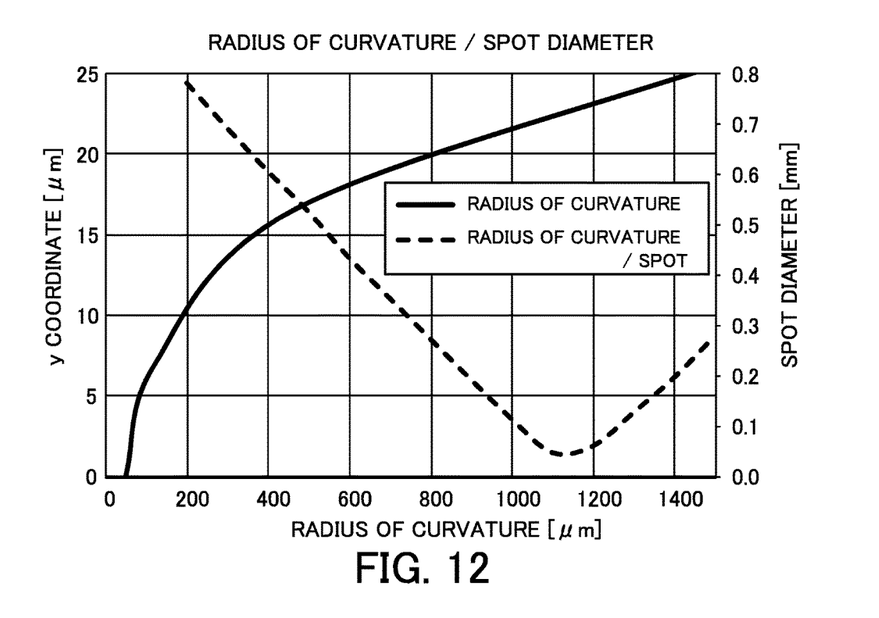
FIG. 12 is a correlation graph of a radius of curvature of the cell boundary part and a spot diameter on a panel surface.

Referring to FIG. 12, the radius of curvature of the cell boundary part 9 and a radius of a spot (spot diameter) on the panel surface will be described. FIG. 12 is a correlation graph of the radius of curvature of the cell boundary part 9 and the spot diameter on the panel surface. A solid line in FIG. 12 represents the radius of curvature of the cell boundary part 9 (or its periphery) in a flat plane which is parallel to the short side direction of the panel (y axis), and the vertical axis and the horizontal axis indicate a y coordinate and the radius of curvature, respectively. As illustrated in FIG. 12, the radius of curvature of the cell boundary part 9 continuously changes from infinity (∞) to 70 μm. This means that a streak is inevitably generated when the conjugate point of the panel is located at the light source side of the first fly-eye lens 2. In other words, it means that the streak is inevitably generated when a light beam enters a region within a range where the radius of curvature of the cell boundary part 9 that continuously changes is a predetermined radius of curvature. As described above, the apparent light emitting point (black dot 115 in FIG. 11) coincides with the conjugate point of the panel surface, the streak is generated. This is because the radius of curvature of the cell boundary part 9 (or its periphery) continuously changes and thus the apparent light emitting point exists, at the light source side of the first fly-eye lens 2, within a range where the radius of curvature is from the infinity (∞) to 70 μm in the optical axis. A dashed line in FIG. 12 indicates the relationship between the radius of curvature of the cell boundary part 9 and the spot diameter (spot size) on the panel surface. The condensing point is reduced in size as the spot diameter is smaller, and therefore the luminance unevenness as the streak becomes prominent. FIG. 12 indicates that the streak is maximized when the radius of curvature R is nearly equal to 1100 μm.

Hereinafter, in each embodiment, the configuration of removing or reducing the streak within a range of the illumination area will be described.

First Embodiment

Figure 1:
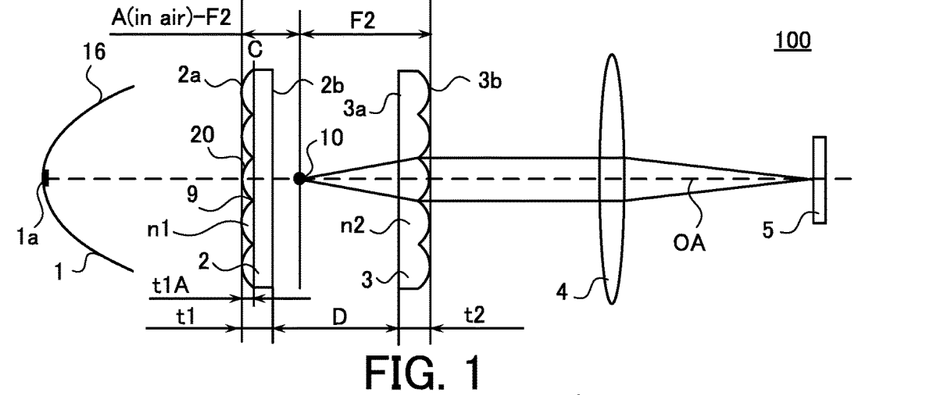
FIG. 1 is a diagram of a main configuration of an image projection apparatus (illumination optical system) in a first embodiment.

First of all, referring to FIG. 1, a first embodiment of the present invention will be described. FIG. 1 is a diagram of a main configuration of an image projection apparatus 100 (liquid crystal projector) in this embodiment. The image projection apparatus 100 includes an illumination optical system capable of reducing a high luminance part (streak) in an end part of an illumination area.

In FIG. 1, reference numeral 1 denotes a light source unit. The light source unit 1 includes a light source 1a and a paraboloid reflector 1b, and the light source unit 1 is configured to emit parallel light from the light source 1a. Reference numeral 2 denotes a first fly-eye lens (first lens array). The first fly-eye lens 2 is a light division unit that divides light emitted from the light source 1a (divides the light into a plurality of light beams). The first fly-eye lens 2 is provided with a surface (incident surface 2a) having a power (refractive power) at a left side in FIG. 1. The incident surface 2a of the first fly-eye lens 2 is provided with a plurality of cells 20 in two dimensions. A cell boundary part 9 is formed between adjacent cells of the plurality of cells 20. The cell boundary part 9 has a concave shape (negative refractive power) as described with reference to FIG. 11. Reference numeral 3 denotes a second fly-eye lens (second lens array), and it is a light division unit that guides (receives) light from the first fly-eye lens 2. Reference numeral 4 denotes a condenser lens, and it is a condenser optical system that condenses light from the second fly-eye lens 3. Reference numeral 5 denotes an image display element, and it is a panel (liquid crystal panel) which light from the condenser lens 4 enters. In this embodiment, the first fly-eye lens 2, the second fly-eye lens 3, the condenser lens 4, and the image display element 5 are arranged in this order from the light source side along a direction of an optical axis OA (optical axis direction) of the condenser lens 4.

In FIG. 1, a black dot 10 indicates a conjugate point of the image display element 5 (panel). In this embodiment, the first fly-eye lens 2 includes the incident surface 2a which the light emitted from the light source 1a enters and an emitting surface 2b that divides the light and emits the divided lights. In this case, the conjugate point (black dot 10) of the image display element 5 is located closer to the emitting surface 2b (at a side opposite to the incident surface 2a) of the first fly-eye lens 2. In other words, a distance between the conjugate point of the image display element 5 and the image display element 5 is shorter than a distance between the first fly-eye lens 2 and the image display element 5 (i.e. the conjugate point of the image display element 5 is closer to the image display element 5 than the first fly-eye lens 2). The conjugate point of the image display element 5 is located between the incident surface 2a of the first fly-eye lens 2 and an incident surface 3a of the second fly-eye lens 3.

In other words, as illustrated in FIG. 1, the conjugate point of the image display element 5 may be located in the air between the first fly-eye lens 2 and the second fly-eye lens 3, or alternatively the conjugate point may be located on the first fly-eye lens 2.

Figure 2:
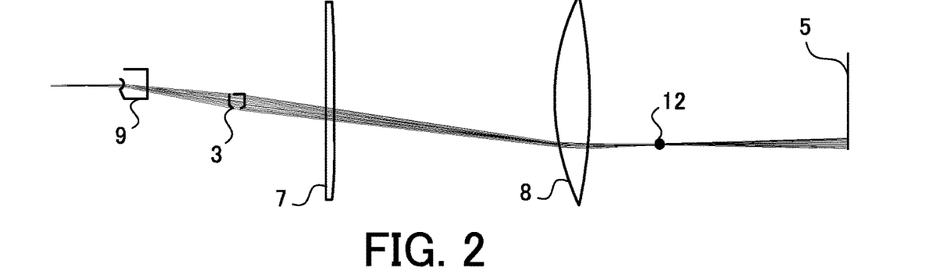
FIG. 2 is a diagram of an optical path of light entering a cell boundary part in the first embodiment.

Subsequently, referring to FIG. 2, an optical path of light that enters the cell boundary part 9 of the first fly-eye lens 2 will be described. FIG. 2 is a diagram of the optical path of the light that enters the cell boundary part 9 of the first fly-eye lens 2. As illustrated in FIG. 2, the light entering the cell boundary part 9 is diverged by the concave of the cell boundary part 9 and is guided to the image display element 5 by the second fly-eye lens 3 and the condenser lens 4 (a first condenser lens 7 and a second condenser lens 8).

In this embodiment, the conjugate point (position indicated by the black dot 10 in FIG. 1) of the surface (panel surface) of the image display element 5 is set to the emitting side of the first fly-eye lens 2. In other words, a distance between the conjugate point of the image display element 5 and the image display element 5 is shorter than a distance between the first fly-eye lens 2 and the image display element 5. Therefore, the parallel light that enters the cell boundary part 9 is condensed short of the panel surface (at a position between the image display element 5 and the second condenser lens 8 (condenser optical system)). A black dot 12 in FIG. 2 indicates a condensing point in this case, and is located at a position which is displaced to the incident side relative to the image display element 5 (panel). Since the light is blurred on the surface of the image display element 5, the high luminance part (streak) is not generated.

Figure 3:
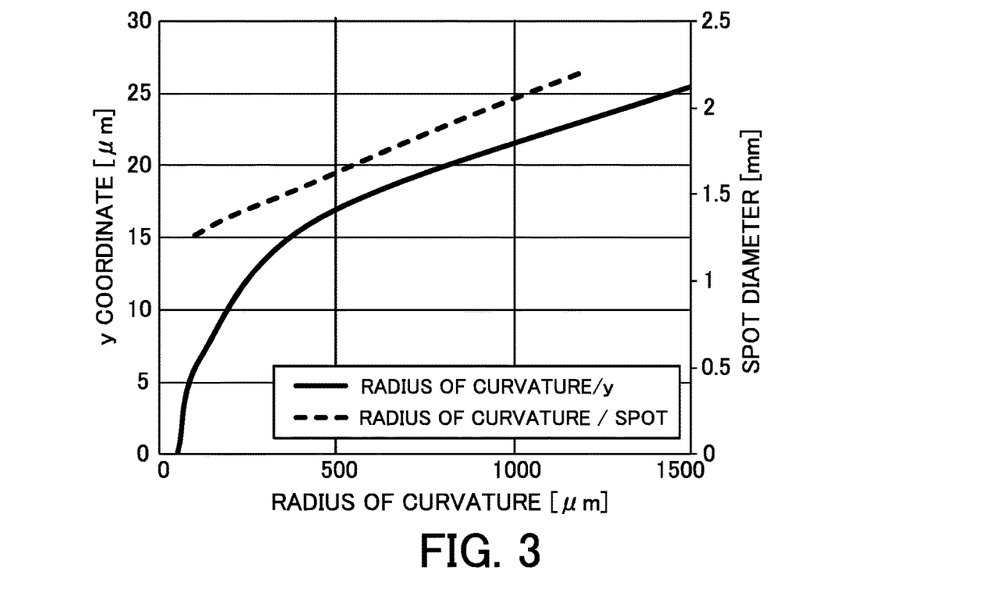
FIG. 3 is a correlation graph of a radius of curvature of the cell boundary part and a spot diameter on a panel surface in the first embodiment.

Subsequently, referring to FIG. 3, a radius of curvature of the cell boundary part 9 and a radius of a spot (spot diameter) on the panel surface in this embodiment will be described. FIG. 3 is a correlation graph of the radius of curvature of the cell boundary part 9 and the spot diameter on the panel surface. A solid line in FIG. 3 represents the radius of curvature of the cell boundary part 9 (or its periphery) in a flat plane which is parallel to a short side direction of the panel (y axis), and a vertical axis and a horizontal axis indicate a y coordinate and the radius of curvature, respectively. As illustrated in FIG. 3, the radius of curvature of the cell boundary part 9 continuously changes from infinity (∞) to 70 μm. As can be seen from FIG. 3, in this embodiment, the spot is always blurred while the radius of curvature R changes from infinity (∞) to 70 μm. According to this embodiment, the spot diameter is always greater than 1 mm and therefore the streak is not generated. This is because the condensing point (black dot 12) in FIG. 2 is displaced from the image display element 5 toward the light source unit 1 in the optical axis direction even when the radius of curvature R changes from infinity (∞) to 70 µm.

Figure 4:
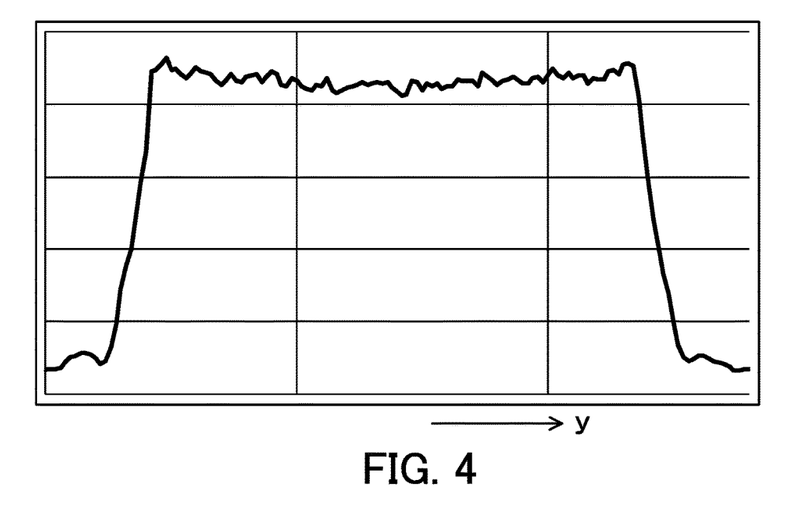
FIG. 4 is a diagram of a luminance distribution in a short side direction of the panel in the first embodiment.

Subsequently, referring to FIG. 4, with respect to an effect of improving the streak (effect of reducing the high luminance part) of the illumination area in this embodiment, an illumination distribution calculation will be described. FIG. 4 is a simulation result (diagram of a luminance distribution in the y direction) in a state where the concave is set to the cell boundary part 9. In FIG. 4, a vertical axis indicates an illuminance and a horizontal axis indicates a position (y axis). As illustrated in FIG. 4, the streak (high luminance part) is removed and a good luminance distribution is obtained differently from FIG. 6.

In this embodiment, it is preferred that a focal length F2 of the second fly-eye lens 3 is shorter than a focal length F1 of the first fly-eye lens 2. More preferably, the focal length F1 of the first fly-eye lens 2 and the focal length F2 of the second fly-eye lens 3 satisfy the following expression (1).

$$0.7 < F2/F2 < 1.0 \quad (1)$$

It is preferred that the illumination optical system (image projection apparatus 100) satisfies the following expression (2).

$$0.010 < (A(\text{in air}) - F2)/A(\text{in air}) < 0.300 \quad (2)$$

More preferably, the illumination optical system (image projection apparatus 100) satisfies the following expression (2a).

$$0.010 < (A(\text{in air}) - F2)/A(\text{in air}) < 0.200 \quad (2a)$$

In expressions (2) and (2a), symbol A(in air) denotes an air conversion length from the incident surface 2a of the first fly-eye lens 2 (first lens array) to the emitting incident surface 3b of the second fly-eye lens 3 (second lens array) in the optical axis direction, and F2 is a focal length of the second fly-eye lens 3. Symbol A(in air) can be obtained by the following expression (3).

$$A(\text{in air}) = t1/n1 + D + t2/n2 \quad (3)$$

In expression (3), symbol t1 denotes a thickness of the first fly-eye lens 2 in the optical axis direction, symbol n1 denotes a refractive index of the first fly-eye lens 2, and symbol D denotes a distance from the emitting surface 2b of the first fly-eye lens 2 to the incident surface 3a of the second fly-eye lens 3. Symbol t2 denotes a thickness of the second fly-eye lens 3 in the optical axis direction, and symbol n2 denotes a refractive index of the second fly-eye lens 3.

In this embodiment, symbol D can be referred to as a thickness of the air between the first fly-eye lens and the second fly-eye lens 3 in the optical axis direction.

Satisfying expression (2), the illumination optical system (image projection apparatus 100) is capable of reducing the high luminance part (streak) at the end part of the illumination area and suppressing the blur in the illumination area.

It is preferred that the illumination optical system satisfies the following expression (4).

$$A(\text{in air}) - F2 > t1A/n1 \quad (4)$$

In expression (4), symbol t1A denotes a thickness of a lens cell part of the first fly-eye lens 2, and symbol n1 denotes a refractive index of the first fly-eye lens 2.

In the illumination optical system (image projection apparatus 100), satisfying expression (4) means that the conjugate point of the image display element 5 is located on the lens cell part of the first fly-eye lens 2.

Satisfying expression (4), the illumination optical system (image projection apparatus 100) is capable of reducing the high luminance part (streak) at the end part of the illumination area and suppressing the influence of the scratch or dust on the surface of the first fly-eye lens 2.

The lens cell part means a portion in which the lens cell is provided in the fly-eye lens, and a portion in which the lens cell part is not provided is referred to as a flat surface part. In other words, each of the first fly-eye lens 2 and the second fly-eye lens 3 includes the lens cell part and the flat surface part.

Specifically, in FIG. 1, a part closer to the incident surface 2a of the first fly-eye lens 2 relative to a straight line C is the lens cell part, and a part closer to the emitting surface 2b relative to the straight line C is the flat surface part.

A numerical example relating to the focal length of each fly-eye lens is as follows.

First Numerical Example

F1=25.3 mm
F2=21.1 mm
F2/F1=0.83

Second Embodiment

Figure 13:
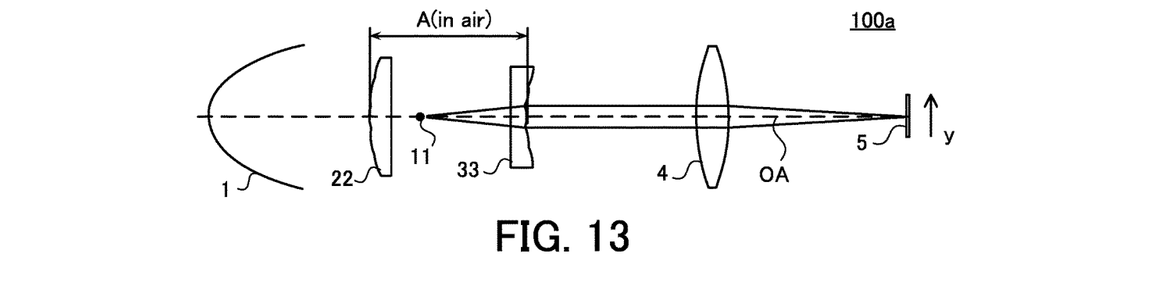
FIG. 13 is a diagram of a main configuration of an image projection apparatus along a short side direction of a panel in a second embodiment.
Figure 14:
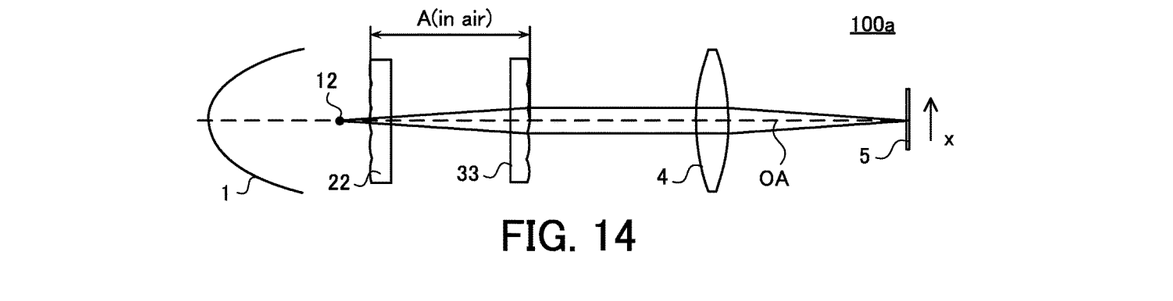
FIG. 14 is a diagram of the main configuration of the image projection apparatus along a long side direction of the panel in the second embodiment.

Next, referring to FIGS. 13 and 14, a second embodiment of the present invention will be described. Descriptions common to those in the first embodiment are omitted. FIG. 13 is a diagram of a main configuration of an image projection apparatus 100a (illumination optical system) along a short side direction (a short side direction of a panel, or a y axis direction) of an image display element 5. FIG. 14 is a diagram of the main configuration of the image projection apparatus 100a along a long side direction (a long side direction of the panel, or an x axis direction) of the image display element 5.

In FIGS. 13 and 14, reference numeral 1 denotes a light source unit that includes a light source and a paraboloid reflector. Reference numeral 22 denotes a first fly-eye lens (first lens array). The first fly-eye lens 22 is configured such that a center of curvature of each cell is displaced (decentered) closer to the optical axis OA relative to the center of each cell in the short side direction of the panel (y axis direction). Reference numeral 33 denotes a second fly-eye lens (second lens array). The second fly-eye lens 33 is configured such that a center of curvature of each cell is displaced (decentered) away from the optical axis OA relative to the center of each cell in the short side direction of the panel (y axis direction). Reference numeral 4 denotes a condenser lens (condenser optical system), and reference numeral 5 denotes an image display element (panel).

In this embodiment, with respect to the first fly-eye lens 22 and the second fly-eye lens 33, each cell of the center of curvature is displaced (decentered) relative to the center of each cell in the short side direction of the cell (short side direction of the panel). In this embodiment, the second fly-eye lens 33 has a toric surface (toroidal surface), and it is configured such that radii of curvature in the long side direction (x axis direction) and the short side direction (y axis direction) of each cell are different from each other. In this embodiment, the radius of curvature in the long side direction of each cell is set to be greater than that in the short side direction of each cell.

FIG. 13 is a cross-sectional view in the short side direction of the cell or the short side direction of the panel (y axis direction). FIG. 14 is a cross-sectional view in the long side direction of the cell or the long side direction of the panel (x axis direction). In FIGS. 13 and 14, each of black dots 11 and 12 indicates the conjugate point of the panel. In other words, with respect to the short side direction of the panel (y axis direction), the conjugate point of the panel (black dot 11) is displaced toward the emitting side of the first fly-eye lens 22 (i.e. a distance between the conjugate point of the image display element 5 and the image display element 5 is shorter than a distance between the first fly-eye lens 22 and the image display element 5). On the other hand, with respect to the long side direction of the panel (x axis direction), the conjugate point of the panel is displaced toward the light source side of the first fly-eye lens 22. In other words, the distance between the conjugate point of the image display element 5 and the image display element 5 is longer than the distance between the first fly-eye lens 22 and the image display element 5 (i.e. the conjugate point of the image display element 5 is farther than the first fly-eye lens 22). This is because the sagging of the shape of the cell boundary part in the fly-eye lens is prominent in a decentered flat surface direction and a great effect is obtained by implementing a countermeasure for the streak described in the first embodiment especially for the decentered flat surface. According to the configuration of this embodiment, particularly the high luminance part (streak) in the short side direction can be removed or reduced.

Figure 15:
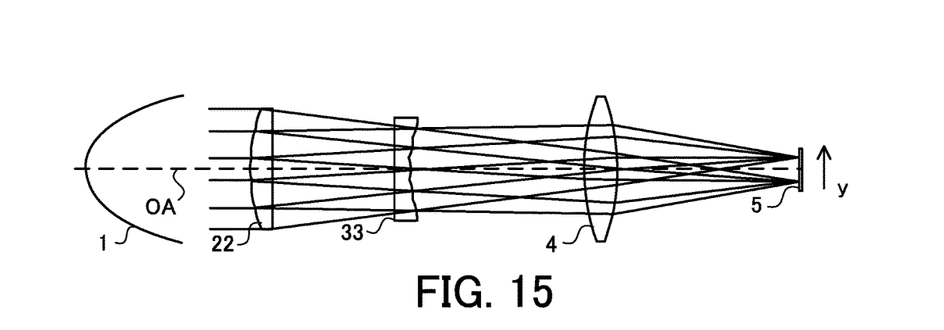
FIG. 15 is a diagram of an optical path of light in the short side direction of the panel in the second embodiment.
Figure 16:
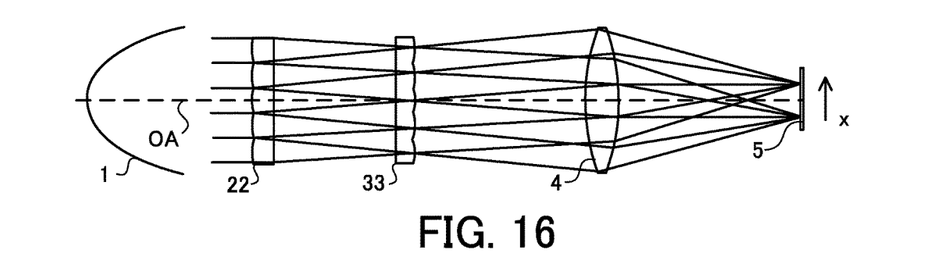
FIG. 16 is a diagram of the optical path of the light in the long side direction of the panel in the second embodiment.

Subsequently, referring to FIGS. 15 and 16, an optical path of light that enters a region other than the cell boundary part of each fly-eye lens will be described. FIG. 15 is a diagram of an optical path of light in the short side direction of the panel (y axis direction). FIG. 16 is a diagram of the optical path of the light in the long side direction of the panel (x axis direction). In FIG. 15, the center of the radius of curvature of each cell is displaced (decentered) relative to the center of each cell. The first fly-eye lens 22 is configured such that the center of curvature of each cell is displaced toward the optical axis OA. On the other hand, the second fly-eye lens 33 is configured such that the center of curvature of each cell is displaced away from the optical axis OA. Accordingly, the light beam can be compressed in the short side direction of the panel (y axis direction) while the light beam is divided into a plurality of light beams. As a result, the image projection apparatus 100a can be reduced in size.

Thus, in this embodiment, each fly-eye lens is configured such that the center of curvature of each cell of each fly-eye lens is displaced (decentered) from a center position of each cell in a predetermined direction in a plane (xy plane) orthogonal to the optical axis OA of the condenser lens 4. The center position of each cell is a center position between both ends of each cell in the predetermined direction. Preferably, the first fly-eye lens 22 is configured such that the center of curvature of each cell of the first fly-eye lens 22 is displaced (decentered) toward the optical axis OA (toward a direction closer to the optical axis OA) of the condenser lens 4 relative to the center position of each cell in the predetermined direction. On the other hand, the second fly-eye lens 33 is configured such that the center of curvature of each cell of the second fly-eye lens 33 is displaced (decentered) away from the optical axis OA relative to the center position of each cell in the predetermined direction. More preferably, the predetermined direction is the short side direction of the image display element 5 (short side direction of the panel).

Preferably, the distance between the conjugate point of the image display element 5 with respect to the shot side direction of the panel, and the image display element 5 is shorter than the distance between the first fly-eye lens 22 and the image display element 5. On the other hand, the distance between the conjugate point of the image display element 5 with respect to the long side direction of the panel, and the image display element 5 is longer than the distance between the first fly-eye lens 22 and the image display element 5.

Preferably, the second fly-eye lens 33 has the toric surface, and it is configured such that the radii of curvature of each cell in the short side direction and the long side direction of the panel are different from each other. More preferably, each cell of the second fly-eye lens 33 is configured such that the radius of curvature in the long side direction of the panel is greater than that in the short side direction of the panel.

Preferably, the following expressions (5) and (6) are satisfied.

$$0.7 < F21/F1 < 1.0 \quad (5)$$

$$F22/F1 > 1.0 \quad (6)$$

In expressions (5) and (6), symbol F1 denotes a focal length of the first fly-eye lens 22, F21 denotes a focal length of the second fly-eye lens 33 with respect to the short side direction of the panel, and F22 denotes a focal length of the second fly-eye lens 33 with respect to the long side direction of the panel.

The focal length with respect to the short side direction of the panel means a focal length in a cross section which is parallel to the optical axis of the illumination optical system and the short side direction of the panel. Similarly, the focal length with respect to the long side direction of the panel means a focal length in a cross section which is parallel to the optical axis of the illumination optical system and the long side direction of the panel.

As illustrated in FIGS. 13 and 14, when the shapes of the lens cell parts of the first fly-eye lens 22 and the second fly-eye lens 33 are different from each other depending on the cross section, A(in air) is defined as an air conversion length between apices of the surfaces of the lens cells at the centers of the fly-eye lenses.

In the cross section illustrated in FIG. 13, it is preferred that the same conditions as those of expressions (2) and (4) described above are satisfied.

Thus, displacing the position of the focal point of the first fly-eye lens 22 in the optical axis direction depending on its cross section, the influence caused by the heat to an optical element can be suppressed.

A numerical example relating to the focal length of each fly-eye lens is as follows.

Second Numerical Example

F1=25.3 mm
F21=21.1 mm
F22=29.4 mm
F21/F1=0.83
F22/F1=1.16

Third Embodiment

Figure 17:
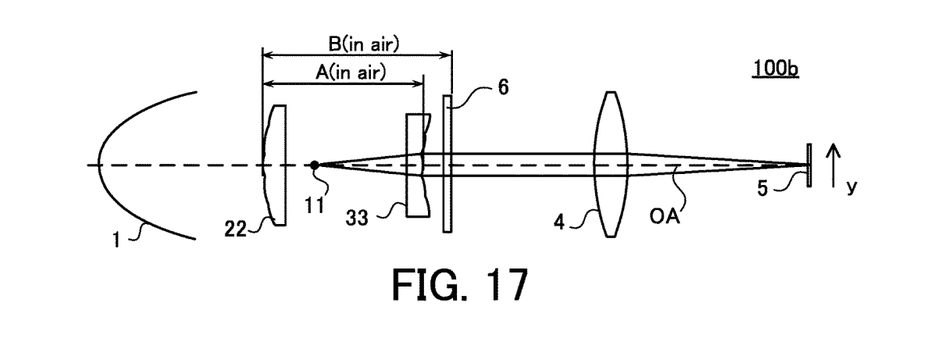
FIG. 17 is a diagram of a main configuration of an image projection apparatus along a short side direction of a panel in a third embodiment.
Figure 18:
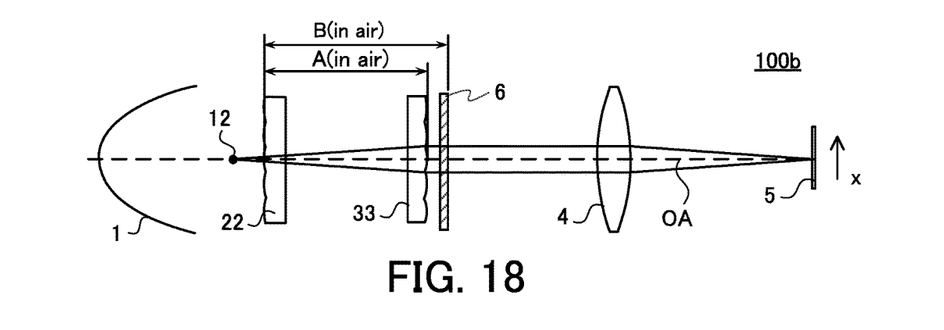
FIG. 18 is a diagram of the main configuration of the image projection apparatus along a long side direction of the panel in the third embodiment.

Next, referring to FIGS. 17 and 18, a third embodiment of the present invention will be described. Descriptions common to those in the first embodiment are omitted. FIG. 17 is a diagram of a main configuration of an image projection apparatus 100b (illumination optical system) along a short side direction (a short side direction of a panel, or a y axis direction) of an image display element 5. FIG. 18 is a diagram of the main configuration of the image projection apparatus 100b along a long side direction (a long side direction of the panel, or an x axis direction) of the image display element 5.

This embodiment is different from the second embodiment in that a polarization conversion element 6 is provided between the second fly-eye lens 33 and the condenser lens 4 (condenser optical system), and the relationship between the focal length of the first fly-eye lens 22 and the focal length of the second fly-eye lens 33 is different. A normal of a polarization splitting surface of the polarization conversion element 6 is parallel to a cross section which is parallel to the optical axis of the illumination optical system and the long side direction of the image display element 5.

In this embodiment, F11 denotes a focal length of the first fly-eye lens 22 with respect to the short side direction of the panel, and F12 denotes a focal length of the first fly-eye lens 22 with respect to the long side direction of the panel. In addition, F21 denotes a focal length of the second fly-eye lens 33 with respect to the short side direction of the panel, and F22 denotes a focal length of the second fly-eye lens 33 with respect to the long side direction of the panel.

In this embodiment, the image projection apparatus 100b (illumination optical system) satisfies the following expressions (7) and (8), where symbol B (in air) denotes an air conversion length from an apex of the surface of the incident surface of the first fly-eye lens 22 to the emitting surface of the polarization conversion element 6.

$$0.9 \leq F11/A(\text{in air}) \leq 1.1 \quad (7)$$

$$0.9 \leq F12/B(\text{in air}) \leq 1.1 \quad (8)$$

Expression (7) means that the focal length F11 is approximately equal to the air conversion length A(in air). In other words, satisfying expression (7) means that the focal point of the first fly-eye lens 22 is located near the second fly-eye lens 33 in the cross section which is parallel to the optical axis of the illumination optical system and the short side direction of the panel.

On the other hand, expression (8) means that the focal length F12 is approximately equal to the air conversion length B(in air). In other words, satisfying expression (8) means that the focal point of the first fly-eye lens 22 is located near the polarization conversion element 6 in the cross section which is parallel to the optical axis of the illumination optical system and the long side direction of the panel.

In this embodiment, it is preferred that the image projection apparatus 100b (illumination optical system) satisfies the following expressions (9) and (10).

$$0.7 < F21/F11 < 1.0 \quad (9)$$

$$0.7 < F22/F12 < 1.0 \quad (10)$$

A numerical example relating to the focal length of each fly-eye lens is as follows.

Third Numerical Example

F11=26.1 mm
F12=29.0 mm
F21=23.5 mm
F22=25.1 mm
F21/F11=0.90
F22/F12=0.87

According to each embodiment, an effective illumination area can be extended up to the end part of the illumination area (i.e. the generation of the streak within the effective illumination area can be reduced). As a result, it is not necessary to ensure a large margin of the illumination area. Therefore, according to each embodiment, an illumination optical system and an image projection apparatus that are capable of achieving projection of a high-luminance and high-quality image can be provided. Each embodiment can be applied to the illumination optical system which is used for the image projection apparatus such as a liquid crystal projector, and is particularly effective in an optical system which includes a fly-eye lens (a lens array or a light division unit).

Numerical examples relating to Expressions (2) and (4) in the embodiments are listed in Table 1 below, and each numerical example satisfies the range represented by Expression (2).

TABLE 1

| NUMERICAL EXAMPLES | D | t1 | t1A | t1A (in air) | t2 | F2 | n1 | n2 |
|---|---|---|---|---|---|---|---|---|
| 4 | 44.3 | 4.8 | 2.8 | 1.9 | 2.8 | 48.8 | 1.49 | 1.49 |
| 5 | 44.3 | 4.8 | 2.8 | 1.9 | 2.8 | 44.5 | 1.49 | 1.49 |
| 6 | 44.3 | 4.8 | 2.8 | 1.9 | 2.8 | 42.2 | 1.49 | 1.49 |
| 7 | 44.3 | 4.8 | 2.8 | 1.9 | 2.8 | 39.7 | 1.49 | 1.49 |
| 8 | 44.3 | 4.8 | 2.8 | 1.9 | 2.8 | 34.8 | 1.49 | 1.49 |

| NUMERICAL EXAMPLES | A (in air) | A(in air) − F2 | A(in air) − F2/A(in air) | A(in air) − F2 > t1A(in air) |
|---|---|---|---|---|
| 4 | 49.4 | 0.6 | 0.012 | x |
| 5 | 49.4 | 4.9 | 0.099 | o |
| 6 | 49.4 | 7.2 | 0.146 | o |
| 7 | 49.4 | 9.7 | 0.196 | o |
| 8 | 49.4 | 14.6 | 0.296 | o |

In each of the embodiments described above, the refracting surface is provided at the incident side (light source side) of the first fry-eye lens, but each of the embodiments is not limited to this and the refracting surface may be provided at the emitting side (second fly-eye lens side) of the first fly-eye lens. When the refracting surface is provided at the emitting side of the first fly-eye lens, it is preferred that the conjugate point of the panel is located between the emitting surface of the first fly-eye lens and the incident surface of the second fly-eye lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075161, filed on Apr. 1, 2014, and Japanese Patent Application No. 2015-045685, filed on Mar. 9, 2015, which are hereby incorporated by reference wherein in their entirety.

What is claimed is:

1. An illumination optical system which illuminates an image display element, the illumination optical system comprising:
   a first lens array configured to divide light emitted from a light source;
   a second lens array configured to receive light from the first lens array; and
   a condenser optical system configured to guide light from the second lens array to the image display element, wherein a conjugate point of the image display element is located between a surface having a refractive power of the first lens array and an incident surface of the second lens array, and wherein the following expression is satisfied:

$$0.010 < (A(\text{in air}) - F2)/A(\text{in air}) < 0.300,$$

where A(in air) is an air conversion length from an incident surface of the first lens array to an emitting surface of the second lens array in an optical axis direction, and F2 is a focal length of the second lens array.

2. The illumination optical system according to claim 1, wherein the incident surface of the first lens array is the surface having the refractive power of the first lens array, and wherein the conjugate point of the image display element is located between the incident surface of the first lens array and the incident surface of the second lens array.

3. The illumination optical system according to claim 1, wherein an emitting surface of the first lens array is the surface having the refractive power of the first lens array, and wherein the conjugate point of the image display element is located between the emitting surface of the first lens array and the incident surface of the second lens array.

4. The illumination optical system according to claim 1, wherein a following expression is satisfied:

$$A(\text{in air}) - F2 > t1A/n1,$$

where t1A is a thickness of a lens cell part of the first lens array, and n1 is a refractive index of the first lens array.

5. The illumination optical system according to claim 1, wherein the first lens array, the second lens array, and the condenser optical system are arranged in this order from the light source along an optical axis direction of the condenser optical system.

6. The illumination optical system according to claim 1, wherein a following expression is satisfied:

$$0.7 < F2/F1 < 1.0,$$

where F1 is a focal length of the first lens array.

7. The illumination optical system according to claim 1, wherein the first lens array includes a plurality of cells and a cell boundary part formed between the plurality of cells, and wherein the cell boundary part has a negative refractive power.

8. The illumination optical system according to claim 7, wherein the condenser optical system is configured to condense light from the cell boundary part of the first lens array on a position between the condenser optical system and the image display element.

9. The illumination optical system according to claim 1, wherein the first lens array and the second lens array are configured such that a center of curvature of each cell of the first lens array and the second lens array is displaced from a center position of each cell in a predetermined direction in a plane orthogonal to an optical axis of the condenser optical system.

10. The illumination optical system according to claim 9, wherein the first lens array is configured such that the center of curvature of each cell of the first lens array is displaced close to the optical axis of the condenser optical system relative to the center position of each cell in the predetermined direction, and wherein the second lens array is configured such that the center of curvature of each cell of the second lens array is displaced away from the optical axis relative to the center position of each cell in the predetermined direction.

11. The illumination optical system according to claim 9, wherein the predetermined direction is a short side direction of the image display element.

12. The illumination optical system according to claim 11, wherein a distance between the conjugate point of the image display element for the short side direction and the image display element is shorter than a distance between the first lens array and the image display element, and wherein a distance between the conjugate point of the image display element for a long side direction and the image display element is longer than the first lens array and the image display element.

13. The illumination optical system according to claim 12, wherein the second lens array has a toric surface and is configured such that radii of curvature of each cell in the short side direction and the long side direction are different from each other.

14. The illumination optical system according to claim 13, wherein each cell of the second lens array is configured such that the radius of curvature in the long side direction is greater than the radius of curvature in the short side direction.

15. An image projection apparatus comprising:
an image display element; and
an illumination optical system configured to illuminate the image display element,
wherein the illumination optical system includes:
a first lens array configured to divide light emitted from a light source,
a second lens array configured to receive light from the first lens array, and
a condenser optical system configured to guide light from the second lens array to the image display element, and
wherein a conjugate point of the image display element is located between a surface having a refractive power of the first lens array and an incident surface of the second lens array, and
wherein the following expression is satisfied:

$$0.10 < (A(\text{in air}) - F2)/A(\text{in air}) < 0.300,$$

where A(in air) is an air conversion length from an incident surface of the first lens array to an emitting surface of the second lens array in an optical axis direction, and F2 is a focal length of the second lens array.

16. An illumination optical system which illuminates an image display element, the illumination optical system comprising:
a first lens array configured to divide light emitted from a light source;
a second lens array configured to receive light from the first lens array; and
wherein a conjugate point of the image display element is located between a surface having a refractive power of the first lens array and an incident surface of the second lens array, and
wherein the conjugate point of the image display element is located within the first lens array.

17. An image projection apparatus comprising:
an image display element; and an illumination optical system configured to illuminate the image display element,
wherein the illumination optical system includes:
a first lens array configured to divide light emitted from a light source;
a second lens array configured to receive light from the first lens array; and
wherein a conjugate point of the image display element is located between a surface having a refractive power of the first lens array and an incident surface of the second lens array, and
wherein the conjugate point of the image display element is located within the first lens array.

18. An illumination optical system which illuminates an image display element, the illumination optical system comprising:
a first lens array configured to divide light emitted from a light source;
a second lens array configured to receive light from the first lens array; and
a condenser optical system configured to guide light from the second lens array to the image display element,
wherein an incident surface of the first lens array is a surface having a refractive power,
wherein a conjugate point of the image display element is located on a light emitting side of the incident surface of the first lens array, and
wherein the following expression is satisfied:

$$0.010 < (A(\text{in air}) - F2)/A(\text{in air}) < 0.300,$$

where $A(\text{in air})$ is an air conversion length from the incident surface of the first lens array to an emitting surface of the second lens array in an optical axis direction, and $F2$ is a focal length of the second lens array.

19. The illumination optical system according to claim 18, wherein a following expression is satisfied:

$$A(\text{in air}) - F2 > t1A/n1,$$

where $t1A$ is a thickness of a lens cell part of the first lens array, and $n1$ is a refractive index of the first lens array.

20. The illumination optical system according to claim 18, wherein the first lens array, the second lens array, and the condenser optical system are arranged in this order from the light source along an optical axis direction of the condenser optical system.

21. The illumination optical system according to claim 18, wherein a following expression is satisfied:

$$0.7 < F2/F1 < 1.0,$$

where $F1$ is a focal length of the first lens array.

22. The illumination optical system according to claim 18, wherein the first lens array includes a plurality of cells and a cell boundary part formed between the plurality of cells, and
wherein the cell boundary part has a negative refractive power.

23. The illumination optical system according to claim 22, wherein the condenser optical system is configured to condense light from the cell boundary part of the first lens array on a position between the condenser optical system and the image display element.

24. The illumination optical system according to claim 18, wherein the first lens array and the second lens array are configured such that a center of curvature of each cell of the first lens array and the second lens array is displaced from a center position of each cell in a predetermined direction in a plane orthogonal to an optical axis of the condenser optical system.

25. The illumination optical system according to claim 24, wherein the first lens array is configured such that the center of curvature of each cell of the first lens array is displaced close to the optical axis of the condenser optical system relative to the center position of each cell in the predetermined direction, and
wherein the second lens array is configured such that the center of curvature of each cell of the second lens array is displaced away from the optical axis relative to the center position of each cell in the predetermined direction.

26. The illumination optical system according to claim 24, wherein the predetermined direction is a short side direction of the image display element.

27. The illumination optical system according to claim 26, wherein a distance between the conjugate point of the image display element for the short side direction and the image display element is shorter than a distance between the first lens array and the image display element, and
wherein a distance between the conjugate point of the image display element for a long side direction and the image display element is longer than the first lens array and the image display element.

28. The illumination optical system according to claim 27, wherein the second lens array has a toric surface and is configured such that radii of curvature of each cell in the short side direction and the long side direction are different from each other.

29. The illumination optical system according to claim 28, wherein each cell of the second lens array is configured such that the radius of curvature in the long side direction is greater than the radius of curvature in the short side direction.

30. An image projection apparatus comprising:
an image display element; and
an illumination optical system configured to illuminate the image display element,
wherein the illumination optical system includes:
a first lens array configured to divide light emitted from a light source,
a second lens array configured to receive light from the first lens array, and
a condenser optical system configured to guide light from the second lens array to the image display element, and
wherein an incident surface of the first lens array is a surface having a refractive power,
wherein a conjugate point of the image display element is located on a light emitting side of the incident surface of the first lens array, and
wherein the following expression is satisfied:

$$0.10 < (A(\text{in air}) - F2)/A(\text{in air}) < 0.300,$$

where $A(\text{in air})$ is an air conversion length from the incident surface of the first lens array to an emitting surface of the second lens array in an optical axis direction, and $F2$ is a focal length of the second lens array.

31. An illumination optical system which illuminates an image display element, the illumination optical system comprising:
a first lens array configured to divide light emitted from a light source;

a second lens array configured to receive light from the first lens array; and a condenser optical system configured to guide light from the second lens array to the image display element, wherein an emitting surface of the first lens array is a surface having a refractive power, wherein a conjugate point of the image display element is located on a light emitting side of the emitting surface of the first lens array, and wherein the following expression is satisfied:

$$0.010 < (A(\text{in air}) - F2)/A(\text{in air}) < 0.300,$$

where $A(\text{in air})$ is an air conversion length from an incident surface of the first lens array to an emitting surface of the second lens array in an optical axis direction, and F2 is a focal length of the second lens array.

32. The illumination optical system according to claim 31, wherein a following expression is satisfied:

$$A(\text{in air}) - F2 > t1A/n1,$$

where t1A is a thickness of a lens cell part of the first lens array, and n1 is a refractive index of the first lens array.

33. The illumination optical system according to claim 31, wherein the first lens array, the second lens array, and the condenser optical system are arranged in this order from the light source along an optical axis direction of the condenser optical system.

34. The illumination optical system according to claim 31, wherein a following expression is satisfied:

$$0.7 < F2/F1 < 1.0,$$

where F1 is a focal length of the first lens array.

35. The illumination optical system according to claim 31, wherein the first lens array includes a plurality of cells and a cell boundary part formed between the plurality of cells, and wherein the cell boundary part has a negative refractive power.

36. The illumination optical system according to claim 35, wherein the condenser optical system is configured to condense light from the cell boundary part of the first lens array on a position between the condenser optical system and the image display element.

37. The illumination optical system according to claim 31, wherein the first lens array and the second lens array are configured such that a center of curvature of each cell of the first lens array and the second lens array is displaced from a center position of each cell in a predetermined direction in a plane orthogonal to an optical axis of the condenser optical system.

38. The illumination optical system according to claim 37, wherein the first lens array is configured such that the center of curvature of each cell of the first lens array is displaced close to the optical axis of the condenser optical system relative to the center position of each cell in the predetermined direction, and wherein the second lens array is configured such that the center of curvature of each cell of the second lens array is displaced away from the optical axis relative to the center position of each cell in the predetermined direction.

39. The illumination optical system according to claim 37, wherein the predetermined direction is a short side direction of the image display element.

40. The illumination optical system according to claim 39, wherein a distance between the conjugate point of the image display element for the short side direction and the image display element is shorter than a distance between the first lens array and the image display element, and wherein a distance between the conjugate point of the image display element for a long side direction and the image display element is longer than the first lens array and the image display element.

41. The illumination optical system according to claim 40, wherein the second lens array has a toric surface and is configured such that radii of curvature of each cell in the short side direction and the long side direction are different from each other.

42. The illumination optical system according to claim 41, wherein each cell of the second lens array is configured such that the radius of curvature in the long side direction is greater than the radius of curvature in the short side direction.

43. An image projection apparatus comprising:

an image display element; and an illumination optical system configured to illuminate the image display element, wherein the illumination optical system includes:

a first lens array configured to divide light emitted from a light source, a second lens array configured to receive light from the first lens array, and a condenser optical system configured to guide light from the second lens array to the image display element, and wherein an emitting surface of the first lens array is a surface having a refractive power, wherein a conjugate point of the image display element is located on a light emitting side of the emitting surface of the first lens array, and wherein the following expression is satisfied:

$$0.10 < (A(\text{in air}) - F2)/A(\text{in air}) < 0.300,$$

where $A(\text{in air})$ is an air conversion length from an incident surface of the first lens array to an emitting surface of the second lens array in an optical axis direction, and F2 is a focal length of the second lens array.

* * * * *